United States Patent [19]
Cantoni

[11] Patent Number: 6,115,486
[45] Date of Patent: Sep. 5, 2000

[54] TELERADIOLOGY SYSTEM FOR THE STORAGE AND TRANSMISSION OF ANGIOGRAPHIC AND RELATED IMAGE SEQUENCES

[75] Inventor: Charles W. Cantoni, Mukilteo, Wash.

[73] Assignee: Quinton Instrument Company, Bothell, Wash.

[21] Appl. No.: 08/964,118

[22] Filed: Nov. 4, 1997

Related U.S. Application Data

[60] Provisional application No. 60/030,205, Nov. 6, 1996.

[51] Int. Cl.[7] .................................................. G06K 9/00
[52] U.S. Cl. ........................................ 382/128; 382/239
[58] Field of Search ................................... 382/128, 130, 382/132, 236, 239; 348/399, 439; 128/922

[56] References Cited

U.S. PATENT DOCUMENTS

| | | | |
|---|---|---|---|
| 4,458,267 | 7/1984 | Dolazza | 358/111 |
| 4,748,511 | 5/1988 | Nichols et al. | 358/256 |
| 4,860,112 | 8/1989 | Nichols et al. | 358/400 |
| 5,173,953 | 12/1992 | Wataya et al. | 382/58 |
| 5,235,510 | 8/1993 | Yamada et al. | 364/413.02 |
| 5,241,472 | 8/1993 | Gur et al. | 364/413.22 |
| 5,289,548 | 2/1994 | Wilson et al. | 382/56 |
| 5,291,401 | 3/1994 | Robinson | 364/413.13 |
| 5,381,798 | 1/1995 | Burrows | 128/696 |
| 5,384,643 | 1/1995 | Inga et al. | 358/403 |
| 5,416,602 | 5/1995 | Inga et al. | 358/403 |
| 5,502,576 | 3/1996 | Ramsay et al. | 358/444 |
| 5,619,995 | 4/1997 | Lobodzinski | 128/653.1 |
| 5,694,316 | 12/1997 | Azancot | 364/413.21 |

OTHER PUBLICATIONS

Stiel et al., "Intelligent Data Reduction: Minimizing Angiocardiographic Laboratory Data in Digital Archiving," IEEE Computers in Cardiology 1994, Sep. 1994, pp. 273–276.

*Primary Examiner*—Andrew W. Johns
*Attorney, Agent, or Firm*—Graybeal Jackson Haley

[57] ABSTRACT

An improved imaging sequence storage and transmission system is disclosed wherein the data files from the imaging sequence may be initially compressed using standard lossless compression techniques and then a non-linear time delay data compression technique may be performed on the data file prior to transmission via telephonic or other means to a remote station for review and analysis. The non-linear time delay data compression technique may also be initially performed on the data file prior to initial storage and then a more severe non-linear time delay data compression technique may be performed on the data file prior to transmission to reduce the ratio of the original data file to the transmitted data file to about 100:1 or more.

31 Claims, 3 Drawing Sheets

TELERADIOLOGY SYSTEM FOR THE STORAGE AND TRANSMISSION OF ANGIOGRAPHIC AND RELATED IMAGE SEQUENCES

This application claims the benefit of U.S. Provisional Application No. 60/030,205, filed Nov. 6, 1996.

FIELD OF THE INVENTION

The present invention relates to a system for the transmission and storage of a portion of an image sequence data file wherein the present invention includes a method of compressing the image sequence data file by a non-linear time sampling method wherein the initial and ending image sequences are sampled less than the images in the middle of the image sequence to provide the user with a compressed file which may be used to provide a preliminary diagnosis of the patient's condition.

BACKGROUND OF THE INVENTION

The present invention relates to a system for the transmission and storage of medical images and more particularly to a system for the transmission, receipt and storage of cardiology related image sequences using a non-linear time sampling and compensated playback system wherein the images of interest are transmitted via conventional methods in a relatively short period of time to a remote location or facility to enable a cardiologist or other specialist to view the images of interest and provide a meaningful consultation to the requesting physician. Additionally, the present invention allows for the rapid transmission of the images of interest over networks or other existing data transmission mechanisms without burdening the system with lengthy and complicated transmissions.

Teleradiology involves the transmission of the images of interest to an off-site or remote location for medical diagnoses or consultation. The most common transmission scenario involves the transmission of the images of interest from a hospital to a physician's home or office. With the increase in managed care and the use of the family practitioner or internist as the gate-keeper, the need for medical consultation with specialists such as surgeons and cardiologists has also increased. For example, there is often a desire to have a cardiologist over-read another physician's angiographic studies to confirm the treatment approach. Additionally, it may be desirable for another physician to review the angiographic study to confirm the need for a surgical procedure or to recommend alternate approaches. Oftentimes it is not practical for the specialist to review the entire record of the medical procedure to verify primary care physician's diagnosis, either due to the specialists schedule or physical location. It is increasingly desirable to be able to transmit a representative record of the medical study to the specialist to enable the specialist to determine whether or not further care is advisable or to make a preliminary diagnosis and recommendation to the primary physician. Similarly, many managers and insurance companies prefer to review the records of a patient to determine if the proposed procedure is advisable. Finally, it may be advisable to store an abbreviated angiographic record at the physician's offices or in the hospital in the event that the patient needs emergency treatment or to serve as a representative medical record in liability matters.

The present invention generally relates to the transmission and storage of radiological images, such as those resulting from angiographic or venogram procedures. Angiography is a diagnostic technique for visualizing the anatomy of arteries in the human heart. A Venogram is a diagnostic procedure which enables the physician to evaluate the efficiency of the patient's heart by observing the wall motion of the patient's heart and evaluating the efficiency of the ejection of blood from the heart of the patient. The procedures are accomplished by inserting a catheter into the area of the artery or heart of interest and injecting an x-ray opaque dye into the artery or heart of the patient. At the same time, an x-ray system exposes the artery or heart, and images are detected on an image intensifier. The images are typically recorded on 35 mm film or digitally via a television camera and then subjected to an analog to digital conversion for display and analysis.

These cardiographic procedures represent special difficulties for the storage and transmission of meaningful images because the studies are very data intensive. For example, a typical angiographic image study consists of about ten imaging sequences which range from about 4 to 12 seconds and average about six seconds in length. In the United States, these images are typically captured at a frame speed of about 30 frames per second and at about 25 frames per seconds in European countries which use 50 Hz power. It is important to maintain the intensity of this type of image to allow the physician to provide an accurate diagnosis. Therefore, in the United States, these images are typically digitized in a 512 by 512 by 8 bit image matrix, although other resolution matrices are also possible. Therefore, the total digital data required to represent a typical angiographic study may be between about 500 MB to about 1,000 MB. With currently available transmission methods, the time necessary to transmit a complete study makes it impractical to transmit the entire study each time a consultation is appropriate or the physician desires to review relevant portions of the study later at his office or home.

A common method of reducing the amount of digital data stored from angiographic studies is to utilize compression techniques that take advantage of the redundancy in the images and reduce the overall size of the study data file. These compression techniques oftentimes significantly reduce the amount of data to be stored. The compression techniques typically fall within two general types, lossless and lossy. In lossless or errorless compression, the uncompressed data at the receiving end or data restoration end of the system is identical to the original data. In lossy compression, the exact original data image cannot be recreated at the receiving or data restoration end of the system. Additionally, many lossy compression techniques may introduce artifacts or other potential errors into the uncompressed images. Lossless compression can typically reduce the amount of data for a typical angiographic image by about two. Lossy compression techniques can produce much higher compression ratios at the expense of errors, distortion or artifacts in the uncompressed image. The introduction of errors into the uncompressed image is totally unacceptable to the medical community when angiographic images are transmitted. Due to the need for highly accurate images, lossy compression is typically not acceptable for angiographic images. Additionally, with currently available transmission methods, compression rates significantly greater than two are necessary to provide an economically feasible and practical transmission system.

In a commercially available system known as ANGIO-COMM from Quinton Instrument Company, each image sequence is A/D converted, filtered and written into the local memory of a data storage device. At the conclusion of the image sequence, the image data is immediately compressed and data reduced for storage on the local hard drive of the local data storage device. The stored data may be reviewed later on the local data storage device or other review stations which are interconnected with the local data storage device by a conventional local area network system. The data compression techniques used for data storage in the ANGIO-COMM system include circular blanking, compression, A/D filtering and/or time domain data reduction depending on the user's preferences and requirements. The circular blanking involves the blanking of the acquires image outside of the circle which represents valid image data so that the area outside the valid image data is not written to the file. This represents a lossless compression of about 1.18 to 1. The size of the acquired image data circle may be selected by the user and is ideally set slightly larger than the blanking conventionally provided by the X-ray system to ensure that no valid image data is lost. Further compression may be used to take advantage of the redundancies found in most X-ray images by using conventional compression techniques to compress the images in the X-Y direction based on the quality and harshness of the images to provide an additional compression in the range of about 2:1 or 3:1. Finally, a limited time domain data reduction algorithm is provided to undersample at the beginning and end of the image sequence and acquire full samples during the middle of the image sequence. This represents a further data compression of about 2:1. As a result of using each of these compression methods, the stored data files for the image sequences may be reduced by about 8:1. Although this is beneficial for the storage of image sequences, significantly higher compression rates are needed for the commercially viable transmission of image sequences and other large data files telephonically or via other network systems.

In U.S. Pat. No. 5,291,401 granted to Robinson, a teleradiology system is disclosed which is directed to the collection, transmission and reception of raw digital data from a radiological device. The system disclosed in this patent describes the transmission of slices of radiological images using an undisclosed compression technique that enables the receiving physician to subsequently filter and evaluate the images transmitted by the technician.

Because the transmission of angiographic images is preferably conducted by transmitting image sequences rather than individual slices which, may or may not represent the best available images or provide sufficient context for the specialist to adequately review the angiographic record of the patient, the system disclosed in this patent does not appear to represent a viable system for the use in cardiology or other data intensive areas of the medical industry.

SUMMARY OF THE INVENTION

The present invention utilizes commercially available hardware and modified software to transfer and store video data from an imaging or radiological device to a remote viewing device. The present invention may be used to capture, transmit and receive the images of interest by filtering the analog video signal generated by the radiology equipment and converting it to digital data using a video digitizer or frame grabber. The frame grabber is usually connected to the video output jack of the radiological device's video monitor. The frame grabber digitizes the analog video signal and forwards the digitized data to the transmission device. A filtering step may also be performed at this time to remove any noise which may have been generated during the A/D conversion process. The digitized data is then preferably stored and then transmitted to the remote location in a compressed format using a modem and standard telephone equipment or via the system network. At the receiving site, the digitized video data is received by a second modem or receiver and is uncompressed and converted back to a video signal and displayed on the remote display for review by the physician or technician.

When an X-ray film system is used, the film is placed on a light box and a video camera is pointed at the light box. The signal from the video camera is connected to the frame grabber. The digitized data is then sent to the storage and transmission device for transmission to the receiving device. If a digital X-ray system is used, the data signal may be transmitted directly from the X-ray system to the storage and transmission device.

The preferred form of the imaging system of the present invention includes the X-ray system which may be connected to a network base or interface station, an archive station, a CD-ROM carousel station, a hemodynamic monitoring system, a file server and a review station. The review station preferably includes a modem therein to allow for the transmission of the imaged sequences to a remote station which may be similar to the review station. The interface station is connected to the X-ray system in the manner described above and serves as the system manager for the on-line storage and distribution of the image sequences for the hospital catheterization laboratory. The file server preferably operates on a conventional network software package such as NOVELL NETWARE and operates in a Redundant Array of Inexpensive Disks (RAID) configuration. The network interface station preferably provides the user with the capability to capture, store, review, communicate and archive image sequences in a digital format from the X-ray system during the injection sequences. The sequences are preferably initially stored on a local hard disk of the interface station for immediate retrieval. The image sequences may then be transferred to the archive station for transfer onto a CD-ROM for longer term storage. The file server provides temporary storage for the image sequences and also preferably allows for on-line immediate review and analysis of the image sequences. The image sequences may also be transferred to the review station for storage, analysis and modem transfer to a remote station or system having a modem connection thereon. The review station may also be used to download image sequences in the industry standard DICOM disk writing format to transfer the image sequences from a CD-ROM from another system into the present system and to provide compressed image data files for transmission along a hospital information system.

In the present invention, the review station preferably includes a modem therein to allow the network and the review station to communicate the image sequences to a remote system or remote review station via standard telephonic connections. As described more fully below, the review station of the present invention preferably includes a specialized compression mechanism to reduce the size of the data file for each image sequence to a manageable size for transmission and storage of the data file at the remote station. The particular method of data reduction involves a process which is described herein as non-linear time sampling with compensated playback. This method takes advantage of the characteristics of angiographic image sequences where the initial and ending portions of the imaging sequences are not as crucial as the images during the middle of the imaging sequences. Therefore, the present data compression method truncates the imaging studies so that fewer images are retained during the initial and ending stages of the imaging sequence and all or nearly all of the images during the peak portion of the sequence are retained.

Another feature of the compression method of the present invention occurs during the reconstruction of the image sequence after storage and/or transmission. In order to maintain the overall time period for the image sequence, the images which are adjacent to the removed images from the image sequence are repeated so the user observes an image sequence which appears to be nearly identical to the original image sequence while consisting of a data file which is one-half or less than the size of the original data file. Because the images are non-linearly removed from the image sequence, the images which are the most important to the diagnosis of the patient are the same or nearly the same as the original image sequences and the images which are illustrative of the buildup and dispersal of the imaging dye in the area of interest are the most truncated due to the lower diagnostic value of these types of image sequences. An important advantage to the present compression technique is that the individual images that are transmitted to the remote station are identical to the original individual images and therefore no errors or distortion are introduced during the compression and decompression steps to the individual images.

For example, the storage of images may occur at an increasing rate of 7.5, 10, 15 and then 30 frames per second for the initial portion of the image sequence and the decrease from 30 frames per second to 15, 10 and 7.5 frames per second near the end of the image sequence. In this example, the difference between the stored 7.5 frames per second and the actual recording rate of 30 frames per second would be filled by repeating the adjacent images during compensated playback of the image sequence. In situations where greater compression is desired, the storage rate may be initially as low as 0.75 frames per second and peak at 3.0 frames per second to provide a remote reviewing physician with a relatively small data file which still accurately represents the actual images from the image sequence of the patient. If the physician determines that further data is desirable, more of the file may be transmitted to the remote station or the entire data file may be copied to a DICOM disk for delivery to the physician's office for the final analysis and diagnosis.

An object of the present invention is to provide an image sequence storage and transmission system which provides the user with the option to significantly reduce the size of the data files without introducing errors into the images.

Another object of the present invention is to provide a system which allows for the transmission of a truncated image sequence data file which enables the physician to accurately review and diagnose the image sequences from a remote location.

Yet another object of the present invention is to provide an image sequence review system which provides for the accurate and rapid storage, analysis and/or transmission of the image sequences either in the catheterization laboratory, to another location in the hospital or at a remote location.

An advantage of the present invention is that the system of the present invention may be used in combination with currently available data compression procedures to further reduce the size of the data files from the image sequences without reducing the quality, intensity or accuracy of the image sequences.

DETAILED DESCRIPTION OF THE PREFERRED EMBODIMENTS

Figure 1:
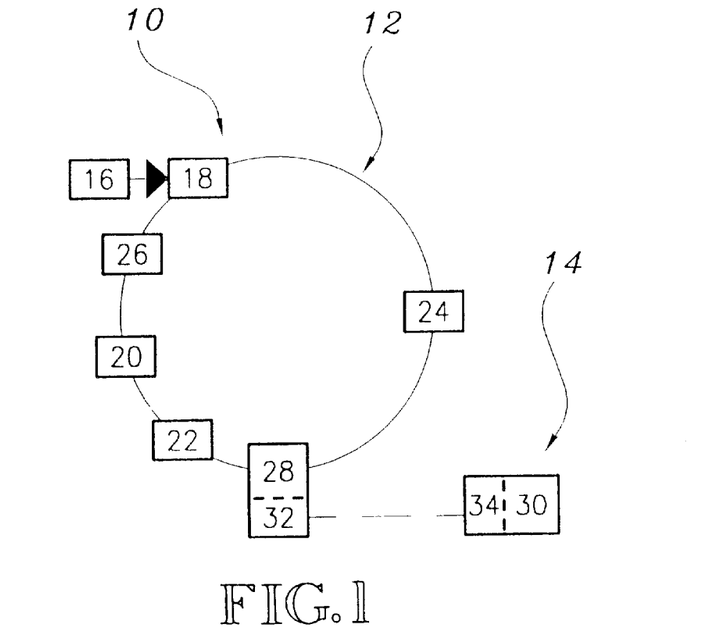
FIG. 1 is a block diagram of the preferred form of the teleradiology system of the present invention.
Figure 2:
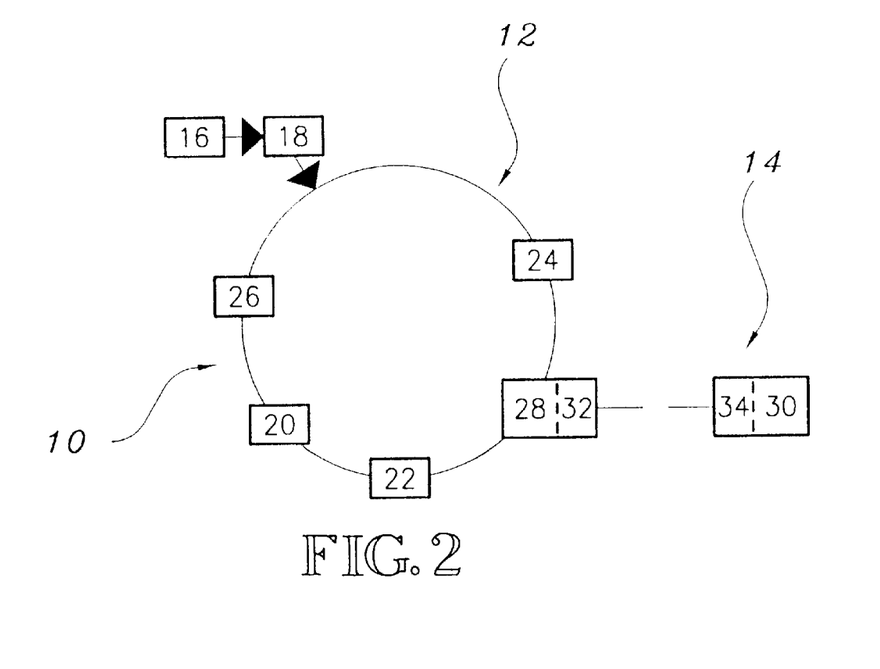
FIG. 2 is a block diagram of an alternate form of the teleradiology system of the present invention.
Figure 3:
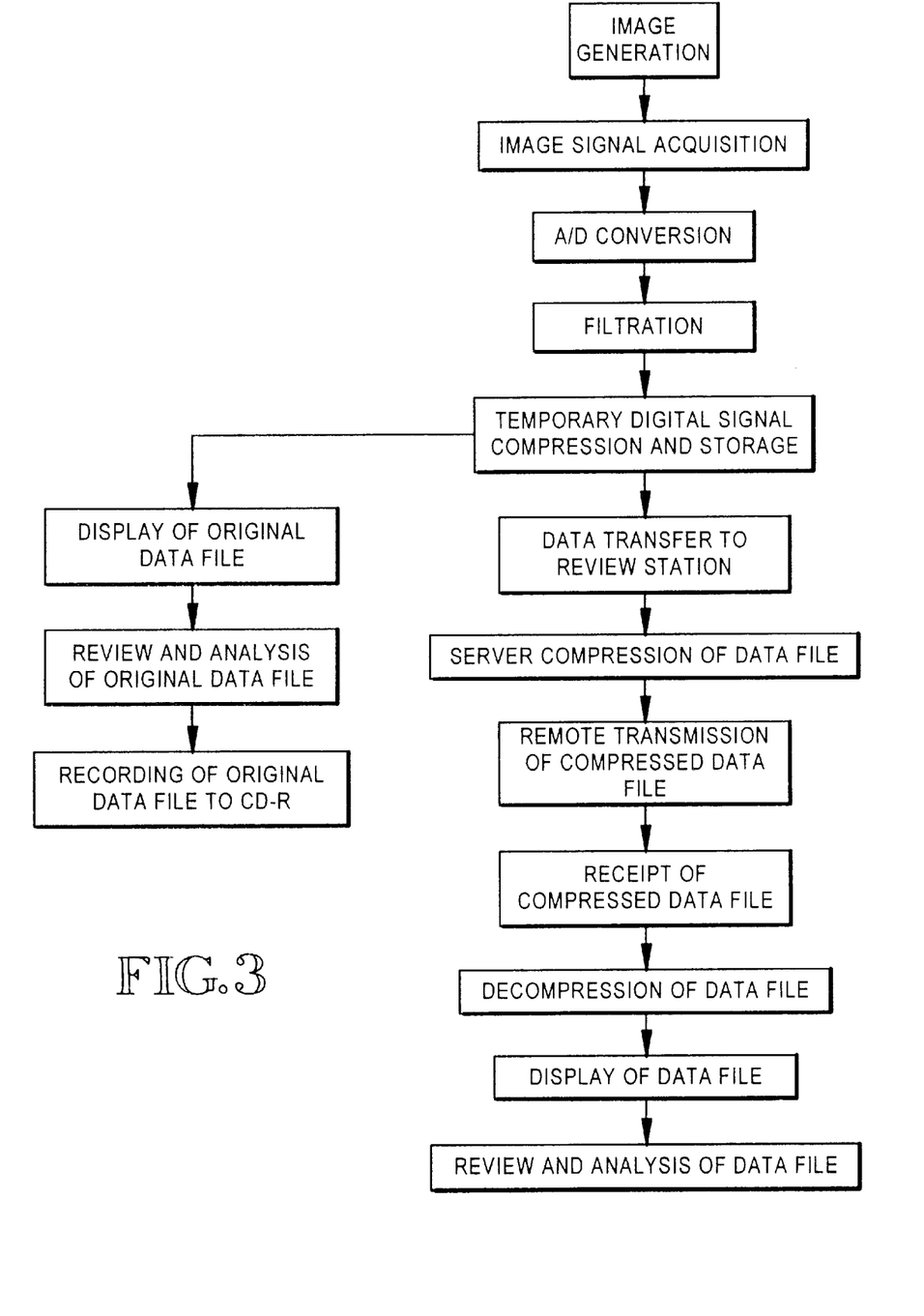
FIG. 3 is a flow diagram of the main functions of the preferred form of the present invention.
Figure 4:
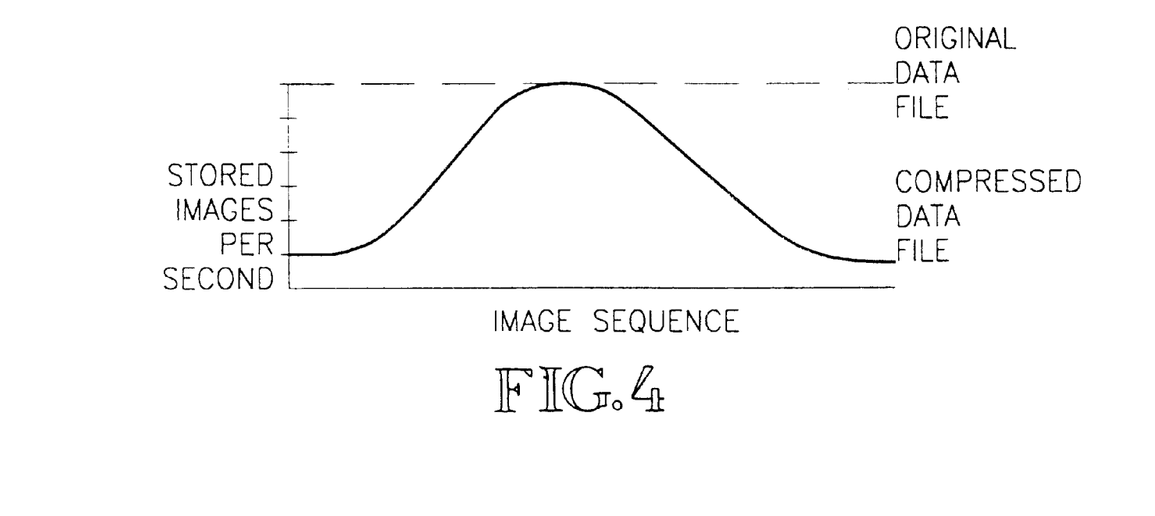
FIG. 4 is a schematic diagram illustrative of one form of the non-linear time delay data compression of the present invention.
Figure 5:
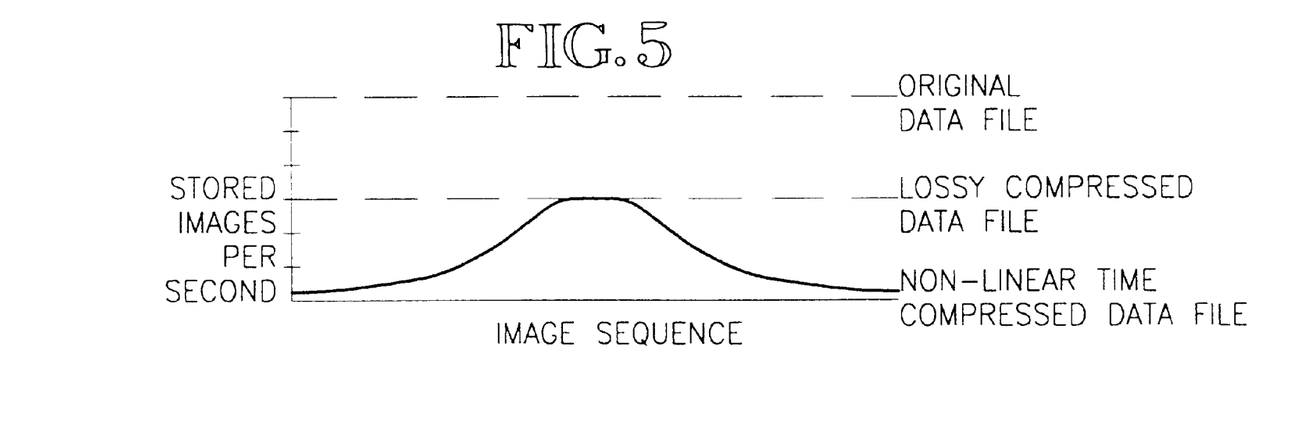
FIG. 5 is illustrative of an alternate form of the non-linear time delay data compression of the present invention.

As shown generally in FIG. 1, the preferred form of the present invention includes an imaging system 10 having an image sequence acquisition, storage and transmission portion 12 and an image sequence receiving portion 14. The preferred form of the image sequence acquisition, storage and transmission system of the present invention includes the X-ray system 16 which may be connected to a network base or interface station 18, an archive station 20, a CD-ROM carousel station 22, a hemodynamic monitoring system 24, a file server 26 and a review station 28. The acquisition and transmission portion 12 of the imaging system 10 may also include a commercially available frame grabber (not shown) which is connected to the video output jack of the X-ray system's 16 video monitor. The frame grabber grabs the analog video signal which is representative of the image sequences from the video monitor at approximately 30 frames per second. When an X-ray film system is used, the film is placed on a light box and a video camera is pointed at the light box. The signal from the video camera is connected to the frame grabber and converted and filtered by the acquisition, storage and transmission portion 12 of the imaging system 10. The analog data is initially sent to the interface station 18 for A/D conversion, filtration and temporary storage. The digital signal is then subsequently transmitted to the review station 28 and other components of the acquisition and transmission portion 12 of the imaging system 10 via the local area network. When a digital X-ray system is used, the digital signal may be sent directly to the interface station for filtration and temporary storage.

The interface station 18 automatically acquires, compresses and stores the signal which is representative of the image sequence from the X-ray system 16 when the interface station 18 is in the system ready mode. The interface station 18 may also be used to review a prior image sequence, mark portions of an image sequence for later analysis or for adjusting the greyscale pixel value of one or more of the displayed images once the acquisition function is completed. Similarly, the interface station 18 may be used to delete a sequence or study from the imaging system files in the event of an accidental acquisition of unimportant images. The hardware of the interface station 18 preferably includes a PENTIUM class personal computer having 64 MB RAM, 2 GB SCSI hard drive, PCI bus hard drive controller, Video A/D board with VGA display and a Network Interface Card. The software of the interface station 18 preferably includes MS-DOS 6.22 operating system, file building software, network interface software and various other utilities. The local hard drive of the interface station 18 is configured to automatically store each image sequence from the frame grabber and preferably has the capacity to temporarily store approximately 15 to 20 studies. Thereafter, the files from the interface station are periodically transferred to the archive station as described below. When the interface station 18 is not acquiring image sequences, it may be used as a review station to review studies from the local hard drive, the network file server, a CD-ROM access carousel and an archive station.

The interface station 18 is connected to the X-ray system 16 in the manner described above and serves as the system manager for the on-line storage and distribution of the image sequences for the hospital catheterization laboratory. The interface station 18 preferably provides the user with the capability to capture, store, review, communicate and archive image sequences in a digital format from the X-ray system 16. The sequences are preferably initially digitally converted, filtered and stored on a local hard disk of the interface station 18 for immediate retrieval and may be marked for later analysis during the acquisition process. The contrast and brightness of the displayed images greyscale pixel values may also be manually adjusted at anytime to improve the viewing of difficult images. After completion of the A/D conversion and acquisition of the study, the image sequences may then be transferred to the file server 26 and/or archive station 20 for longer term storage and to provide an initial backup copy of the study. Additionally, the interface station 18 may be used as a review station when the interface station is not being used to acquire image sequences, so that studies which are stored on the local hard drive, network file server 26, carousel station 22 and on a CD-ROM may be reviewed by the user. During the review process, the user initially selects the study of interest and then selects the injection sequence to be reviewed. Once the sequence has been initially reviewed, the user may adjust the view rate of the injection sequence to view the injection sequence forward or backward and at a rate of between 5 frames per second to 30 frames per second or image by image. The user may also adjust the magnification and gray scale presentation for selected images.

As described above, the interface station 18 acquires image sequences in raw form from the X-ray system imaging chain TV video output. Each sequence is A/D converted, filtered and written into the local memory of the interface station 18. At the conclusion of the image sequence, the image data is immediately compressed and data reduced for storage on the local hard drive of the interface station 18. The compression and reduction process requires approximately the same length of time as it took to do the original image sequence and the interface station 18 is then available to acquire further image sequences. The image and compression techniques used in the present invention preferably include circular blanking, compression, A/D filtering and/or time domain data reduction depending on the user's preferences and requirements. The circular blanking involves the blanking of the acquires image outside of the circle which represents valid image data so that the area outside the valid image data is not written to the file. This represents a lossless compression of about 1.18 to 1. The size of the acquired image data circle may be selected by the user and is preferably set slightly larger than the blanking conventionally provided by the X-ray system 16 to ensure that no valid image data is lost. Further compression may optionally be used to take advantage of the redundancies found in most X-ray images by using conventional compression techniques to compress the images in the X-Y direction based on the quality and harshness of the images to provide an additional compression in the range of about 2:1 or 3:1. In the preferred form of the present invention, a limited non-linear time delay data compression technique is used by the interface station 18 prior to the initial storage of the imaging sequence to provide an additional compression of about 2:1. Therefore, the initial image data compression for the storage of the image data on the interface station 18 preferably includes a total lossless data compression of about 8:1.

As described above, the interface station 18 performs limited A/D filtering of the converted digital signal from the X-ray system 16. As is typical, 8-bit A/D converters are preferably used to convert the analog signal to digital representations having 256 levels of grey scale for images. The A/D filter reduces the noise caused by the A/D conversion process to produce a slight smoothing of the digital data and provide better angiographic image quality. As with the compression techniques described above, the A/D filtering may be preferably turned on or off by the user to enable the user to customize the imaging system 10 to optimize the imaging sequences depending on the setup of each hospital or group practice.

The file server 26 preferably serves as the manager or on-line storage and distribution of digital imaging sequences for the cardiac catheterization laboratory. The file server 26 preferably operates on a conventional local area network via a software package such as NOVELL NETWARE and operates in a Redundant Array of Inexpensive Disks (RAID) configuration. The file server 26 provides temporary redundant storage for the image sequences and also preferably allows for on-line immediate review and analysis of the image sequences. The file server 26 preferably has a memory capacity of at least 20 GB so that about 400 patient studies may be stored on the file server 26. The file server 26 is preferably used in combination with the archive station 20 and carousel station 22. The study data from the file server 26 is automatically copied to the archive station 20 to provide redundant file storage. The study data is initially copied onto a dedicated hard disk cache which is then written to a CD-R. The CD-R is preferably a write once and read many optical disk that may be read from any industry standard CD-R reader.

In the present invention, the archive station 20 preferably includes a PENTIUM class personal computer with 64 MB RAM, 1 GB SCSI hard drive, 550 MB IDE drive, PCI bus hard drive controller, network interface card and a CD-R writer. The carousel station 22 preferably operates in combination with the archive station 20 and the remainder of the network to provide high volume data storage and quick access to approximately 240 CD-R media so that the prior studies of the hospital or cardiac catheterization lab may be easily recalled and reviewed.

The hemodynamic monitoring system 24 is preferably a Q-CATH cardiac monitoring system manufactured by Quinton Instrument Company of Bothell Wash., U.S.A. The hemodynamic monitoring system monitors and records the heart rate and other important physiological or hemodynamic information of the patient during the procedure.

The image sequences and other patient data may also be transferred from the interface station 18, file server 26 or archive station 20 to the review station 28 for storage, analysis and modem transfer to a remote station 30 or another network system, such as a hospital information system. The review station 28 may also be used download image sequences in the industry standard DICOM disk writing format to transfer the image sequences from another system into the present system or from the present system to another system using a CD-ROM which includes the image sequences stored thereon in the industry standard DICOM recording format. Additionally, the review station may be used as part of the local area network as described above, or as a standalone workstation where studies are read from CD-R media or are transmitted to the review station by modem 32.

The hardware of the review station 28 preferably includes a PENTIUM class personal computer with a tower central processing unit, a monitor and a keyboard. The review station preferably includes a minimum of 64 MB RAM, 2 GB SCSI hard drive, PCI bus hard drive controller, Network interface card, high quality monochrome monitors of 17 and/or 21 inch for single and dual sequence systems, respectively, a modem 32 and a CD-R reader. The software of the review station 28 preferably includes a MS DOS 6.22 operating system with review software and various utilities. The review station 28 is preferably configured as a node on the network system to allow direct access to the file server 26. When the review station 28 is used as a standalone system, the CD-R reader serves as the archive for the studies and downloads the studies to the local hard drive of the review station 28. The review station 28 allows the user to store up to about thirty studies on the local hard drive and select the desired study and imaging sequence for review and analysis. The review station 28 may be used to control the direction and speed of the imaging sequence for review by the user. Additionally, the desired image may be magnified and the contrast and brightness of the displayed image's grey scale pixel value may be adjusted as desired by the user. The review station 28 also includes an optional edge enhancement feature to sharpen the edges of the images to highlight portions of the walls of the blood vessel or to highlight the movement of a portion of the wall of the patient's heart. Finally, the user may mark certain image frames for analysis of the diameter of the blood vessels and heart wall motion using commercially available software known as ARTREK and VENTREK which is available from Quinton Instrument Company. The review station 28 may also be used to create a DICOM disk of any study to enable the entire study to be transferred to another system or CD-R reader.

The present invention also preferably includes a nonlinear time delay data compression or time domain data reduction compression feature which may be used alone by the review station or in combination with the other compression techniques. In the preferred form of the present invention, a significantly higher degree of non-linear time delay data compression is used by the review station 28 prior to the telephonic or other transmission of the data file. This non-linear time delay data compression technique takes advantage of the nature of the angiographic or similar image sequences when dye is injected into the area of interest in the patient. Typically, there is very limited useful information to be gained when the dye is initially injected and at the end of the image sequence when the dye is dispersed. Therefore, this compression technique takes advantage of this lower need for information at differing times in the image sequence by providing a variable rate of sampling of the image sequences. Normally, this compression technique undersamples at the beginning and end of the imaging sequence and provides full or nearly full sampling during the middle of the imaging sequence. During playback of the imaging sequence, the time domain is corrected by repeating the stored images for a time equal to the number of sequences which were not stored so that the length of time of the actual imaging sequence is the same as the length of time of the displayed imaging sequence. An example of this type of compression technique involves the storage of every fourth image during the first and final sections of the imaging sequence and then selecting every other image for the second and second to last sections of the image sequence. The central section of the image sequence is stored at the full acquisition rate so that the actual acquired images during the most critical portion of the imaging study are retained for later review and analysis. This compression technique may be used to provide additional data compression of about 1.8:1 or greater so that the transmitted data is compressed at a ratio of about 16:1 as compared to the original image data. In situations where extremely compressed data files are acceptable, the compression technique may sample at initial and final sampling rates of 0.75 frames per second for ten percent of the images sequence and then increase to 1.0 frames per second and 1.5 frames per second for the next two ten percent sections of the image sequence, respectively and finally at a sampling rate of 3.0 frames per second for about forty percent of the image sequence in the area of interest to create a data file which is significantly compressed. This extreme sampling is primarily useful in situations where the data file is transmitted remotely to a specialist who has been asked to provide an initial opinion concerning a preliminary diagnosis of the patient. In this situation, the uncompressed original data file would be typically copied in its entirety to a CD-ROM which would then be brought to the specialist by the patient at the follow-up appointment for thorough review by the specialist to confirm the initial diagnosis following review of the compressed image sequence. An advantage of this compression technique is that although it may significantly reduce the size of the data file for each imaging sequence, no errors are introduced in the acquired images because each saved image is retained without any distortion of the acquired image.

In an alternate situation where extremely compressed data files is acceptable, the compression technique may sample at initial and final sampling rates of 0.75 frames per second for five percent of the images sequence and then increase to 1.0 frames per second for the next ten percent and 1.5 frames per second for the next fifteen percent sections of the image sequence, respectively and finally at a sampling rate of 3.0 frames per second for about forty percent of the image sequence in the area of interest to create a data file which is significantly compressed but which accurately reflects the actual image sequences of the patient.

In another alternate form of the present invention, where extremely compressed data files are acceptable for the initial transfer and review of the data file, the compression technique may sample at variable sampling rates which may be as high as an initial and final sampling rate of 1 frame per second for the first and final 15% of the image sequence and then at 1.25 frames per second for the next and next to last 10% of the image sequence and then a rate of 1.5 frames per second for the next and third to last 10% of the image sequence and finally at a sampling rate of 3.0 frames per second in the area of interest which consists of the middle 30% of the image sequence, to create a data file which is significantly compressed as compared to the original imaging sequence data file.

This type of compression technique is particularly useful for angiography image sequences and may be used in combination with a procedure where the user manually identifies the initial and end points of the imaging sequence, such as end diastolic and end systolic images in a venogram. The user may then apply an automatically or manually selected rate of compression to the remainder of the imaging sequence. The overall compression rate of the transmitted data may be about 8:1 without introducing significant distortion of the imaging sequence and up to about 100:1 or more if extreme sampling of the imaging sequence is conducted.

The review station 28 of the present invention preferably includes a commercially available modem 32 therein to allow for the transmission of the imaged sequences to a remote station 30 which may be similar to the review station 28 described above. In the present invention, the data file is preferably transferred from the interface station 18 or file server 28 to the review station 28 where a severe non-linear time delay data compression is performed. As described above, this non-linear time delay data compression technique takes advantage of the nature of the angiographic or similar image sequences when dye is injected into the area of interest in the patient. Typically, there is very limited useful information to be gained when the dye is initially injected and at the end of the image sequence when the dye is dispersed. Therefore, this compression technique takes advantage of this lower need for information at differing times in the image sequence by providing a variable rate of sampling of the image sequences to provide a data file for transmission which is significantly smaller than the data file which is stored on the acquisition, storage and transmission portion 12 of the imaging system 10. The transmitted data file may be transmitted telephonically to a remote station 30 or via a network interface to nearly any location in a hospital or hospital system via a hospital information system without tying up the transmission lines for a significant length of time.

Once the transmitted data file is received by the modem 32 of the remote station 30 or by the remote station on the hospital information system, the data may be uncompressed, manipulated and reviewed by the physician. During playback of the imaging sequence on the remote station 30, the time domain is preferably corrected by repeating the stored images for a time equal to the number of sequences which were not stored so that the length of time of the actual imaging sequence is the same as the length of time of the displayed imaging sequence. The extreme sampling of the imaging sequences is particularly useful in the present situation where the data file is transmitted remotely to a specialist who has been asked to provide an initial opinion concerning a preliminary diagnosis of the patient. The compressed data files are particularly useful for telephonic transmission or via a hospital information network where the capacity for data transfer is limited. In the present invention, the images that are transmitted remotely are uncompressed and represent a severely truncated portion of the actual images from the imaging sequence. The compression technique preferably stores or transmits less than one-half and more preferably less than one-tenth of the images present in the actual acquired image sequence. Even more preferably, the compression sequence of the present invention preferably stores or transmits less than one-fourth the images from the initial and end portions of the image sequence than are stored during the middle or area of interest of the image sequence. In certain circumstances, the entire compressed study file for the image sequences may be less than 5 MB. In the present invention, the other forms of lossless compression are preferably performed on the data files as they are stored to the interface station 18 and/or file server 26 and are completely independent of the compression performed on the transmitted data files. The severe compression of the transmitted data files using this non-linear time delay data compression technique is preferably performed only on the data to be transmitted by the review station 28 and is performed immediately prior to the transmission of the data file to the remote station 30. One method to accomplish this feature is to include a menu for the user to select the amount of compression desired for each transmission as part of the transmission setup procedure for the review station 28. For example, the menu may identify compression ranging from 2:1 to 100:1 to enable the user to select the desired amount of compression. The truncated data file is then preferably transmitted to the remote station 30 using a modem and standard telephone equipment or via the hospital information system network. The user may then transmit the selected compressed file and then contact the physician to determine if the physician is satisfied with the transmitted data file to perform their diagnosis. If further information is desired, a lower compression rate may be selected. The uncompressed original data file may then also be copied in its entirety to a CD-ROM which may then be brought to the specialist by the patient or courier for use at a follow-up appointment to enable the specialist to confirm the initial diagnosis following review of the compressed image sequence.

At the receiving site, the truncated data file is received by a second modem 34 or receiver and is converted back to a video signal and displayed on the remote station 30 for the physician or technician. The truncated data file may include a notation in the beginning thereof to identify the amount of compression which was applied to the data file to allow the user at the remote station 30 to apply the appropriate playback compensation to the data file. The physician may then initially review the truncated image sequence in the time expanded format where the stored images are duplicated to replace the missing images so that the initial image sequence on the remote station 30 is representative of the length of time of the original imaging sequence. The physician may then control the direction and speed of the imaging sequence for their subsequent review. Additionally, the desired image may be magnified and the contrast and brightness of the displayed image's grey scale pixel value may be adjusted to the desired level. The remote station 30 may also include an optional edge enhancement feature to sharpen the edges of the images to highlight portions of the walls of the blood vessel in a selected image or to highlight the movement of a portion of the wall of the patient's heart during a selected sequence. As described above, in the preferred form of the present invention, the remote station 30 is essentially a standalone review station which is independent of the imaging network or system. Therefore, it is anticipated that the remote station 30 may perform all of the data analysis and review functions described above with respect to the review station 28.

In addition to being in telephonic connection with the review station 28, the remote station 30 may be connected to the review station via a hospital information system. In many hospitals, the hospital information system is used to transfer limited patient data between various departments and the hospital information system does not have the capacity to accept the transfer of an entire imaging sequence data file. Therefore, the transfer of compressed imaging sequence data files using the non-linear time delay data compression technique described above is particularly useful and advantageous for a physician or administrator to perform an initial review of the abbreviated imaging sequence data file for a selected patient.

It is also anticipated that a modified version of the non-linear time delay data compression technique may be used in combination with a lossy compression technique such that the data file may be compressed to a ratio of about 100:1. In this type of hybrid compression technique, the initial lossy compression technique may be performed to create a data file which is reduced to a ratio of about 20:1. The non-linear time delay data compression technique may then be used to further reduce the data file by a ratio of about 5:1 so that size of the transmitted data file is reduced to one-hundredth of the original data file. Using this hybrid compression technique, the remote station 30 may then decompress the data file to the 20:1 ratio created by the lossy technique. As the physician reviews the imaging sequence on the remote system, the physician will be observing the compressed lossy version of the imaging sequence. When the physician stops the image sequence to view a selected image, the nearest full resolution image will be displayed for the physician.

A further variation of the non-linear time delay data compression technique may also be used where the most important images are sent first and then the less important images are sent later and reconstructed by the remote station 30 to enable the user to determine the size of data file to be sent by selecting the length of time for the transmission. With this technique, the images from the middle portion of the angiographic sequences would be sent first and then the sequences from the initial and end portions of the imaging sequence would be transmitted later in the transmitted as time permits. In this variation of the non-linear time delay data compression technique, the remote station 30 would be required to receive the entire data file and then recompile the order of the image sequences such that the first image sequences which were received would be positioned in the center of the image sequence and the later received image sequences would be alternately placed before and after the first image sequences. While it is anticipated that this variation of the non-linear time delay data compression technique would require increased processing time for the remote station to recompile the image sequences, the advantage of transmitting the most important images first may be crucial in certain emergency situations.

While the foregoing is intended to be illustrative of the currently preferred forms of the present invention, it is anticipated that a person skilled in the present art may develop certain variations of the presently described imaging system and compression technique without departing from the scope of the present invention as set forth in the following claims.

What is claimed is:

1. A system for the transmission of data files representative of a sequence of images from a radiological device comprising;
    a data file collection system for the collection of data files representative of image sequences of a patient which are generated by a radiological device;
    a first data storage device for storing said data files wherein said first storage device stores selected data files representative of said image sequences wherein said selected data files representative of individual images are selected at a variable rate from said data files representative of image sequences;
    a transmission device in operative combination with said first storage device for the transmission of said selected data files; and
    a receiving device in operative combination with a second storage device wherein said selected data files are received from said transmission device and stored on said second storage device.

2. The system of claim 1 further including a data display, recording and/or analysis device for the receipt of the output of said receiving device.

3. The system of claim 1 further including a reformatting device in operative combination with said receiving device for reformatting said selected data files to provide a further data file representative of said data files representative of image sequences.

4. The system of claim 1 wherein all of the data files representative of the image sequences of most interest to the user are selected for storage and transmission from said data files representative of image sequences.

5. The system of claim 1 further including a frame grabber for receiving said data files representative of image sequences of a patient which are generated by said radiological device.

6. The system of claim 5 wherein said data file collection system further includes an interface system and said interface system converts said data files representative of image sequences from an analog signal to a digital signal and said interface system filters said digital signal.

7. A system for the transmission of data files representative of a sequence of images from a radiological device comprising;
    a data file collection system for the collection of data files representative of image sequences of a patient which are generated by a radiological device;
    a first data storage device for storing said data files wherein said first storage device stores selected data files representative of said image sequences wherein said selected data files representative of individual images are selected at a reduced rate from said data files representative of image sequences at the beginning of said image sequence and more data files representative of individual images are selected during the middle of the image sequences;
    a transmission device in operative combination with said first storage device for the transmission of said selected data files; and
    a receiving device in operative combination with a second storage device wherein said selected data files are received from said transmission device and stored on said second storage device.

8. The system of claim 7 wherein all of the data files representative of the image sequences of most interest to the user are selected at a rate of about 15 to 30 frames per second for storage and transmission.

9. The system of claim 7 wherein fewer individual images are selected at the end portion of the image sequence than during the middle portion of the image sequence.

10. The system of claim 7 wherein said receiving device replays said selected data files on a display member and said displayed data files are repeated on said receiving device sequentially to represent a reconstructed image sequence which is representative of the length of time of the original image sequence originally received from the radiological device.

11. A system for the transmission of data files representative of a sequence of images from a radiological device comprising;
    a data file collection system for the collection of data files representative of image sequences of a patient which are generated by a radiological device;
    a first data storage device for storing said data files wherein said first storage device stores selected data files representative of said image sequences wherein said selected data files representative of individual images are selected at an increasing and then decreasing rate from said data files representative of image sequences such that the middle portion of the selected data files most closely represent the actual sequence of images received from the radiological device;
    a transmission device in operative combination with said first storage device for the transmission of said selected data files; and
    a receiving device in operative combination with a second storage device wherein said selected data files are received from said transmission device and stored on said second storage device.

12. The system of claim 11 wherein said transmission device transmits said selected data files telephonically to said receiving device.

13. The system of claim 12 wherein said transmission device and said receiving device each include modems operatively associated therewith.

14. The system of claim 11 wherein said transmission device transmits said selected data files via a network to said receiving device.

15. A method of storing, transmitting and receiving data files representative of a sequence of images from a radiological device comprising;

receiving data files which are representative of image sequences of a patient that are generated by a radiological device;

storing at least a portion of the received data files in a first data storage device and storing selected data files representative of selected images of the image sequences wherein said selected data files are representative of individual images which are selected at an increasing and decreasing rate from the data files representative of image sequences such that the portion of the selected data files which are of most interest to the user also most closely represent the actual sequence of images received from the radiological device;

transmitting the selected data files with a transmission device in operative combination with said first storage device for the transmission of the selected data files; and receiving the transmitted selected data files with a receiving device in operative combination with a second storage device wherein the transmitted selected data files are received from the transmission device and stored on said second storage device.

16. The method of claim 15 wherein the selected data files are stored at the same rate at the beginning portion of the image sequence as at the end portion of the image sequence.

17. The method of claim 15 wherein the selected data files are transmitted to the receiving device telephonically.

18. The method of claim 15 wherein the selected data files as transmitted to the receiving device via a network.

19. The method of claim 15 wherein all of the data files are stored during the middle of the image sequence which is the portion of the data files which are of most interest to the user.

20. The method of claim 15 wherein less than one-fourth of the original data files are stored as selected data files at the beginning portion of the image sequence.

21. A teleradiology system comprising:

means for collecting data representative of a sequence of images from a radiological device;

means for selecting a portion of the data representative of a sequence of images from the radiological device wherein said means for selecting acquires a portion of said data representative of a sequence of images which is representative of selected images from the image sequence and said means for selecting selects fewer selected images during two of the beginning, middle or ending portions of the image sequence than in the other of the beginning, middle or end portions of the image sequence;

means for transmitting said selected images which transmits data files representative of said selected images;

means for receiving said data files of said selected images transmitted by said means for transmitting; and means for the display, recording and/or analysis of said data files representative of said selected images.

22. The system of claim 21 wherein said means for display, recording and/or analysis includes a means for reformatting to display said data files representative of said selected images over a length of time which is similar to the length of time of the original sequence of images.

23. The system of claim 21 wherein said means for selecting selects nearly all of the data files representative of the images from the original image sequence during the middle portion of the image sequence.

24. The system of claim 21 wherein said means for selecting selects less than one-half as many images from the beginning of the image sequence as are selected during the middle portion of the image sequence.

25. The system of claim 21 wherein said means for collecting data representative of a sequence of images from a radiological device compressively stores said data on a first data storage device.

26. The system of claim 25 wherein said means for collecting performs a lossless compression technique on said data prior to storing said data on said first data storage device.

27. The system of claim 26 wherein said first data storage device uncompresses and transfers said data to said means for selecting.

28. The system of claim 21 wherein said means for transmission telephonically transmits said data files representative of said selected images to said means for receiving.

29. The system of claim 21 wherein said means for transmission transmits said data files representative of said selected images to said means for receiving via a network.

30. The system of claim 21 wherein said means for selecting selects four times more images during the middle portion of the image sequence than in the beginning or end portions of the image sequence.

31. The system of claim 21 wherein the user identifies the image sequence portion of interest and the means for selecting selects more image sequences from the identified images sequence portion of interest than in the image sequence portions which are not identified by the user.

* * * * *